United States Patent [19]
Gras

[11] 4,060,364
[45] Nov. 29, 1977

[54] APPARATUS FOR FABRICATING MOLDED ARTICLES USING HIGH-FREQUENCY HEATING

[75] Inventor: Elie Gras, Maisons Alfort, France

[73] Assignee: Societe Immobiliere et Financiere Suchet Alfort (S.I.F.S.A.), Paris, France

[21] Appl. No.: 710,475

[22] Filed: Aug. 2, 1976

[30] Foreign Application Priority Data

Aug. 9, 1975   France ................................ 75.27466

[51] Int. Cl.$^2$ ............................................. B29C 1/12
[52] U.S. Cl. .................................... 425/174; 425/384; 425/389; 425/390
[58] Field of Search ............... 425/384, 174, 389, 390, 425/174.8 R

[56] References Cited

U.S. PATENT DOCUMENTS

| | | | |
|---|---|---|---|
| 1,777,310 | 10/1930 | Hopkinson | 425/384 |
| 1,969,323 | 8/1934 | Person | 425/384 X |
| 2,537,182 | 1/1951 | Bertrand | 425/174 X |
| 3,411,186 | 11/1968 | Huff | 425/174 X |

*Primary Examiner*—Richard B. Lazarus
*Attorney, Agent, or Firm*—Browdy and Neimark

[57] ABSTRACT

An apparatus for fabricating molded articles includes a turntable rotatable about an axis and having an edge. A number of independent diaphragm presses are supported for rotation with the turntable and are spaced from its axis of rotation. A fixed high-frequency heating station is positioned above and in the vicinity of the edge of the turntable, the station including a hood which defines a cavity into which the presses are sequentially positioned. A cooling device is positioned either to the side of the turntable or mounted on the turntable coaxially with its axis of rotation. Conduits connect or couple the cooling device to the presses to effect cooling of the presses subsequent to removal from the heating station as they advance to a parting station.

10 Claims, 6 Drawing Figures

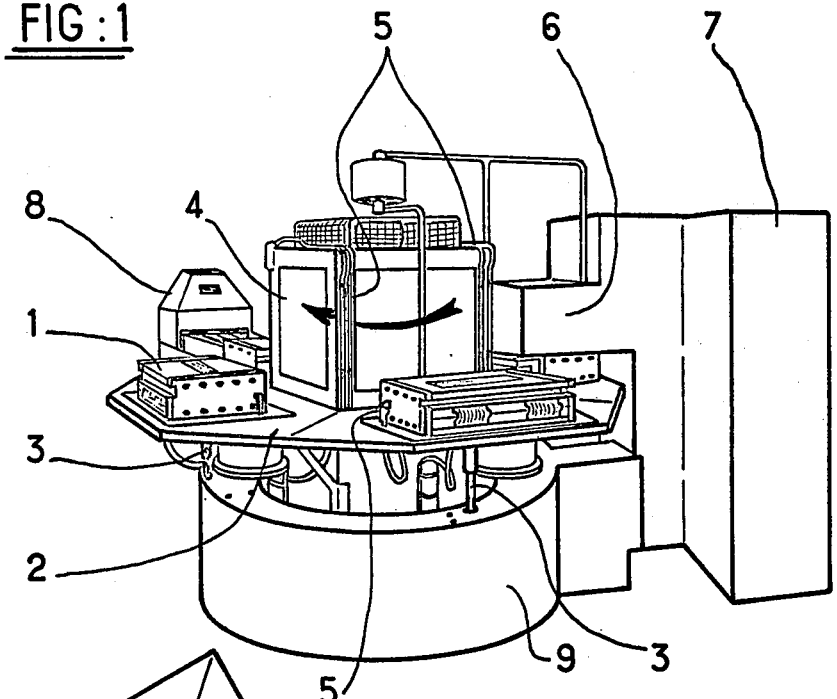
FIG: 1
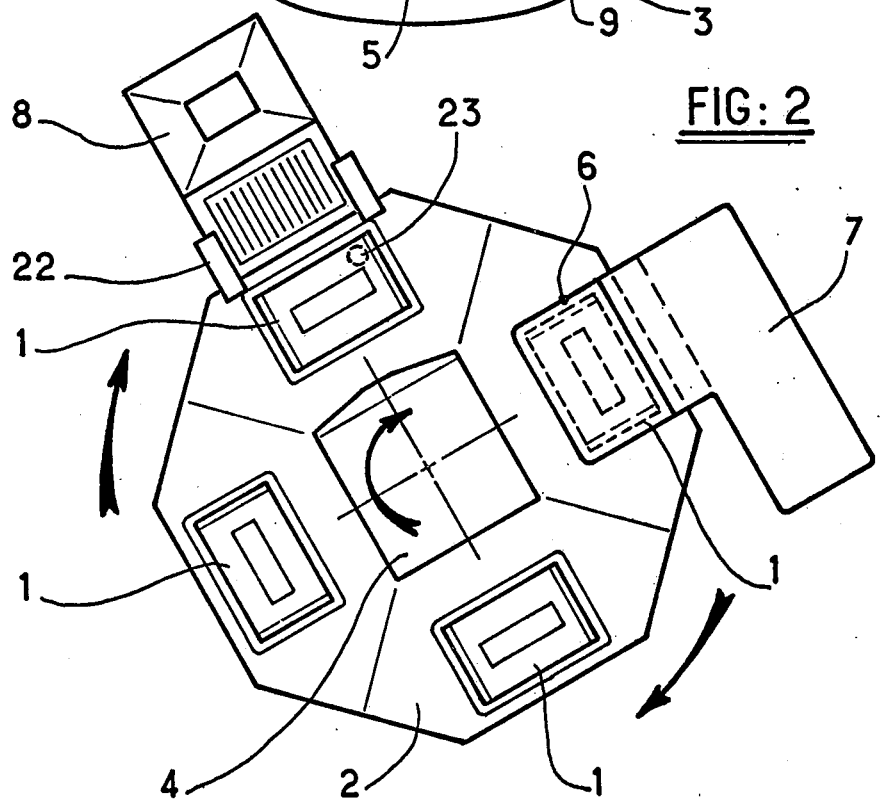
FIG: 2

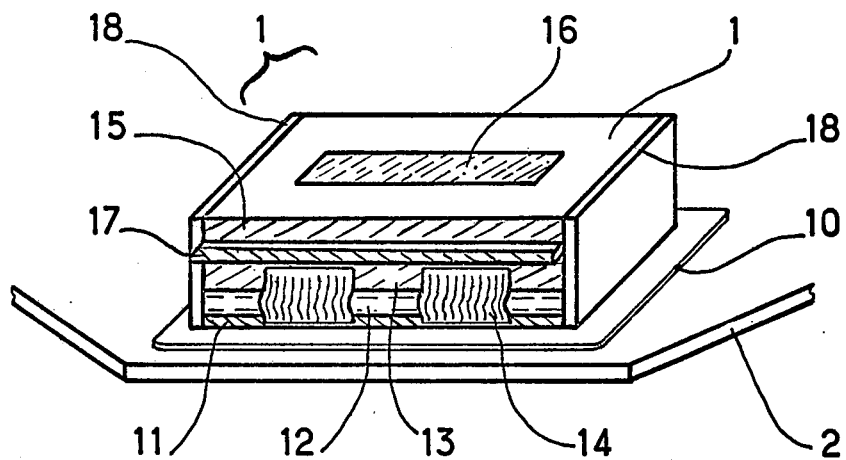
FIG:3
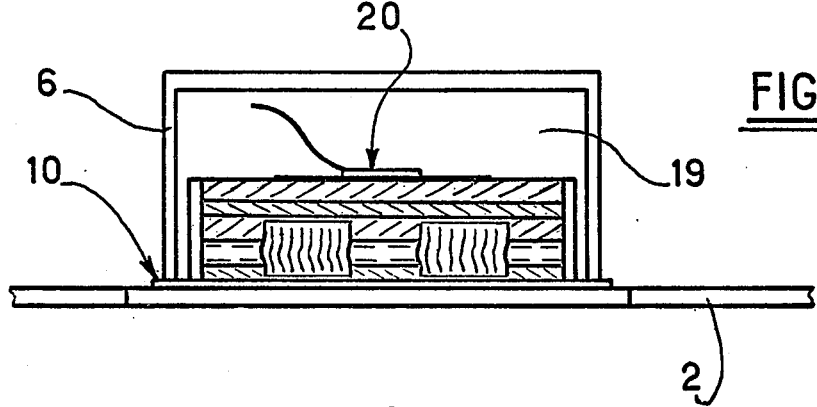
FIG:4b
FIG:4a

FIG:5
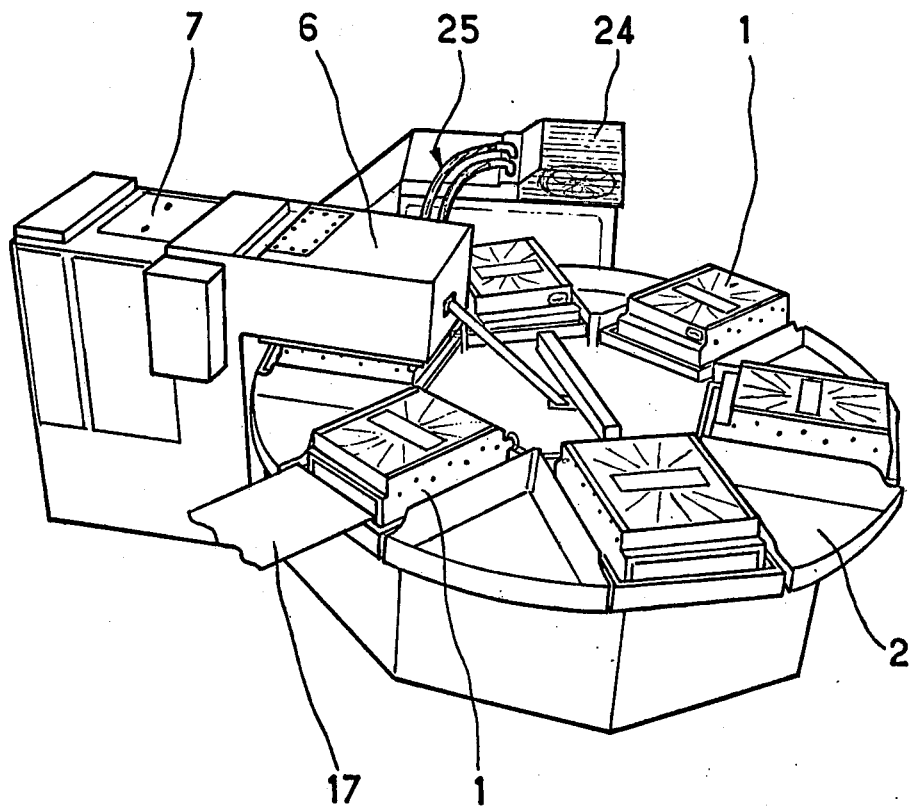

APPARATUS FOR FABRICATING MOLDED ARTICLES USING HIGH-FREQUENCY HEATING

BACKGROUND OF THE INVENTION

This invention relates to apparatus for fabricating molded plastic articles and for continuously obtaining plastic preforms in the shape of the hollow parts of a mold, which may produce a design or pattern on the articles. In particular, the invention relates to a new, automatic, molding apparatus having a turntable carrying a plurality of molds, which are subjected successively to heating and cooling.

It is well known that various molded articles, for example the parts composing boot uppers and legs made of synthetic material, can be obtained by filling the hollow parts of a mold with a plastic such as polyvinyl chloride in powder or plastisol form, the hollow parts being the negatives of the design to be reproduced. After application to the mold of a material forming the lining (in the case of a boot part), the mold and its contents are subjected to high-frequency heating, while the contents of the mold are placed under pressure, after which cooling enables the formed plastic part corresponding to the hollow mold design to be parted immediately from the mold. Such a technique, in several versions, is well known and has been described in a number of patents.

Known molding apparatus based on the aforementioned technique presently operate automatically. The most sophisticated of these known apparatus are of the carrousel type, which have a turntable on which the molds filled with plastic and closed under their mold-carrying plates are disposed at regular intervals, the molds being brought successively under a high-frequency heating press, then under a cooling press, which presses are mounted at fixed points around the turntable. Such apparatus indeed give satisfaction but their use is confined to fabrication of thin articles; in fact it is virtually impossible, while maintaining a profitable rate of manufacture, to cool the molded articles under pressure, and hence dents and other molding deformations cannot be avoided, especially when the article is not flat and has a raised pattern or other kinds of protrusions. Moreover, during operation it is difficult to avoid jolts of the machine which cause the pieces positioned in the molds to shift undesirably. Furthermore, it is difficult to obtain by means of the classic screw spindles used on presently known presses the extremely high compressive pressures often necessary. Finally, defects in parallelism of the molds are difficult to avoid, in addition to which high-frequency heating presses often interfere with telecommunications systems in the vicinity, radio and television sets, and the like.

SUMMARY OF THE INVENTION

It is an object of the present invention to provide an apparatus for fabricating molded articles using high-frequency heating which obviates the above-mentioned disadvantages.

It is another object of the present invention to provide an apparatus for fabricating thick, molded articles and parts by using high-frequency heating presses, which effects fabrication of these articles free of substantial deformations, flaws, dents and the like.

For example, the present invention makes it possible to obtain molded parts such as boot legs with large moldings, shoe soles, orthopedic insoles, suitcase handles, fancy grained objects, which look like leather, and the like at a high rate of speed. In addition, the invention enables thermoplastic raw material (such as polyvinyl chloride for example) to be used in various forms such as powder or beads, sheets, liquids such as plastisols and in other forms as well. Numerous other advantages provided by the invention are to become apparent in the description herein below.

The foregoing objects, as well as others which are to become clear from the text below, are achieved in accordance with the present invention by an apparatus for fabricating molded articles which includes:

a. a series of independent diaphragm presses distributed on a turntable, the individual articles to be molded being held in such presses under pressure during high-frequency heating and cooling;

b. a cooling system for these presses;

c. a fixed high-frequency heating station within which each press fits in turn, the heating station being positioned above and in the vicinity of an edge of the turntable; and d. means, known per se, to effect shifting of the moving parts, operation and cooling of the diaphragm presses, and automatic remote control at a preset rate of the entire apparatus.

According to a salient and novel feature of the invention, each diaphragm press is independent of the others and includes, disposed on a metal plate or bottom support: a fixed lower plate or slab, provided with perforations and covered with a rubber diaphragm having the same surface area as the plate or slab; a floating intermediate plate or slab on which the mold, which is to be filled with material to be molded, is positioned; and a fixed upper plate or slab, the floating plate or slab being designed to press strongly against the upper plate or slab by virtue of the force exerted by the diaphragm which is under the influence of a fluid under pressure.

In practice, the intermediate plate or slab and the lower plate or slab are connected by a conducting metal element, such as metal foil or the like, enabling the high-frequency current to return to ground, the current feed being to the upper plate or slab, as is to be explained below. In addition, the above-described sandwich assembly of the three horizontal plates or slabs is mounted on vertical risers made of insulating material. The fixed lower and upper plates or slabs are cooled by circulation of a fluid from a cooling station positioned either coaxially with the central axis of the turntable or spaced from it. Due to the novel press design of the present invention, the articles to be molded, held under pressure during successive rotation cycles, undergo no deformation; in addition, the applied molding pressure can be very high, reaching for example 3 tons/cm$^2$ for 1 to 2 kg of air pressure (or other fluid pressure) on the diaphragm due to the large surface of the latter, which in the present invention replaces the conventional screw spindles used in known presses.

According to another salient characteristic of the present invention, the fixed high-frequency heating station, supplied and regulated by known conventional techniques, is composed of a shielded hood or cavity into which each press, lifted by a worm gear arrangement or the like, fits in turn such that the bottom, all-metal plate of the press, with dimensions greater than the latter, enables the cavity to be sealed hermetically and to constitute the ground return for the high-frequency current. Transmission of this current to the press is effected by a contactor, which rests on a conducting plate provided above the upper plate or slab of the press. Thus, due to this novel high-frequency heating station design, nearly perfect shielding can be obtained, assuring the absence of any significant interference with telecommunications and health hazards, and thus may comply fully with various national and international regulations regarding high-frequency electromagnetic radiation and the like.

BRIEF DESCRIPTION OF THE DRAWING

The invention can be better understood from a detailed description of the essential elements of the novel apparatus referring to the figures containing the accompanying schematic drawing sheets, wherein:

FIG. 1 is a general simplified perspective view of a first embodiment of an apparatus for fabricating molded articles according to the present invention;

FIG. 2 is a somewhat diagrammatic, top plan view of the apparatus of FIG. 1;

FIG. 3 is a perspective representation of one of the independent presses of the apparatus of FIG. 1; showing the arrangement of its principal parts;

FIGS. 4a and 4b are respective front views of the press of FIG. 3 illustrating the introduction of this press into the high-frequency heating cavity device from its position on the press frame up to its end position fitted into the hood of the high-frequency heating station; and FIG. 5 is a general simplified perspective view of a second embodiment of an apparatus according to the present invention.

DESCRIPTION OF THE PREFERRED EMBODIMENTS

In the non-limitative embodiment of FIGS. 1 and 2, the apparatus for fabricating molded articles includes a series of presses 1 (which can be for example four to six in number) disposed at regular intervals on a turntable 2. A respective piston 3, whose function is to be explained below, is provided beneath each press. In the center of the turntable 2, a cooling device 4, which also rotates with the turntable 2, is provided with fluid conduits 5, which carry cooling water or the like. The conduits 5 supply cooling fluid to the upper and lower parts of the presses 1 and return the fluid to the cooling device 4. The electrical and pneumatic supplies to the presses 2 are provided via conventional, sealed rotating joints. A HF heating hood 6 is fixedly positioned at a fixed station above one edge of the turntable 2 and is connected to its supply generator and high-frequency stabilizer 7. Opposite the press nearest to the hood 6 is fixedly positioned an auxiliary device 8, which is not an essential novel part of the present invention, this device serving as a conventional plastic dispenser-distributor for dispensing material into the molds as they pass the auxiliary device. The apparatus is supported by a frame 9, which rests on a floor.

As may be seen clearly from FIG. 3, each press 1 rests on a respective metal bottom plate 10, which is mounted on the turntable 2. Each press 1 has a lower fixed plate or slab 11, provided with perforations, over whose entire surface is arranged a rubber diaphragm 12, an intermediate plate or slab 13, mobile and electrically connected to the plate or slab 11 by high-frequency conducting foils 14, and a fixed plate or upper slab 15 provided with an electrically conducting plate 16. The conducting plate 16 serves to supply the press 1 with high-frequency current. A mold 17 containing the material to be formed is placed on the floating mobile plate or slab 13. Vertical risers 18 which form the sides of the press are made of an electrically insulating material.

Referring to FIGS. 4a and 4b, a hood 6, designed for high-frequency shielding purposes, is composed of a cavity 19 with inside dimensions slightly larger than those of a press 1 (FIG. 3) and is provided at its upper part with at least one contact element 20 designed to bear on the conducting plate 16 of the press 1. As is to be explained below, when a press 1 fits into the hood 6, the metal bottom plate 10 of the press 1 serves as a shielding plate or closure to the cavity 19 such that external interference from the high-frequency currents used and radiation is virtually avoided.

FIG. 5 shows an illustrative second embodiment of an apparatus according to the present invention which includes a turntable and a series of six presses 1, as in the embodiment of FIGS. 1 and 2. In FIG. 5, the centrally positioned cooling device 4 of FIGS. 1 and 2 has been replaced by an independent cooling and air-conditioning station 24 situated to the side of the turntable 2 and connected by conduits 25 to a fluid dispenser (not shown) for distributing fluid to the fixed plates or slabs of the presses 1.

Of course, both embodiments of the apparatus are provided with a set of conventional instrumentalities, known per se, to drive the diaphragm presses 1 and the high-frequency treatment device 6,7 to rotate the turntable 2, to introduce each press 1 into the high-frequency cavity 19, to effect mold parting, and, in general, automatically to control each element at a preset rate. These conventional auxiliary instrumentalities are not represented in the accompanying drawing figures so that the novel features can be clearly seen.

The apparatus according to the present invention operates as follows: after positioning the charged mold 17 in a press 1, on its intermediate plate or slab 13, compressed air (or another fluid) is introduced for example at 1 to 2 kg of pressure into its fixed plate or slab 11 such as to inflate its associated flexible diaphragm 12 which, by pressing on its floating plate or slab 13, causes the latter to rise and the mold 17 to be squeezed at very high pressure between the plates or slabs 13 and 15. The turntable 2 is then made to rotate and the first of the presses 1 nearest the high-frequency shielding hood 6 is raised into the cavity 19 of hood 6 with the aid of its associated hydraulic jack 21 (FIG. 4a) which bears on the respective aforesaid piston 3, provided under each of the presses 1. The cavity 19 is closed at its base by the press bottom plate 10 being forced against the walls of the high-frequency shielding hood 6. After the heating time preset according to the type of article to be molded, and at frequencies corresponding to the molecular resonance of the plastic in question, (for example 27.12 megacycles or 48 megacycles or any other frequency) the press 1 within the cavity 19 is immediately made to descend, rotation of the turntable 2 is effected, and the next press 1 rises into the cavity 19 within the hood 6. Thus there is no significant time lag after each high-frequency heating. As soon as the heating timer (not shown) signals via its output that the heating period has expired, the press descent-and-rotation cycle is executed, while the molded part remains under pressure after the high-frequency heating.

This enables a high production rate to be achieved. While the turntable 2 continues its rotation, the presses 1 which have been removed from the cavity 19 continue to be cooled or air-conditioned under fluid pressure by either fluid from the central rotation cooling device 4 or fluid from the auxiliary air-conditioning station 24 until it returns to its starting position (loading). At this time, a wiper 22 clears an orifice 23 which depressurizes the diaphragm 12 (see FIG. 2), and thus enables the sandwiched plates or slabs to be released and the now-molded article, ready for use, is then parted from its mold.

The novel high-frequency molding apparatus of the turntable type according to the present invention is adapted to utilization of nearly all types of plastic in various forms (sheets, plates, powder, paste, etc.) as raw material introduced into the hollow mold. The mold itself, made of silicon rubber, is far less costly than the conventional molds employed in known plastic injection molding processes. Among the numerous applications of the above-described apparatus, are the making of fancy "leatherwork" pieces and shoe parts with greater thicknesses in parts such as raised moldings with great perfection in detail, which was impossible using known conventional apparatus.

Of course, the scope of the present invention is not limited to the embodiments described hereinabove and illustrated in the accompanying drawing figures. In practice, various other embodiments, variants and adaptations can be provided within the spirit and scope of the present invention. For example, the number of the presses on the turntable could be changed, and variation in pressure under each press by inserting several compressed air reducing valves could be effected when molds with different surfaces are present, as well as other changes without departing from the scope of the present invention, its scope being defined in the appended claims.

What is claimed is:

1. An apparatus for fabricating molded articles by high-frequency heating of plastic under pressure, comprising:
   a turntable having an edge and an axis of rotation;
   a series of independent diaphragm presses supported on said turntable and spaced from the axis of rotation of said turntable;
   a fixed high-frequency heating station positioned above and in vicinity of the edge of said turntable and into which each press in turn is fitted for heating;
   cooling means operatively coupled to said presses for cooling said presses subsequent to the respective heating thereof in said high-frequency heating station;
   rotation means operatively connected to said turntable for effecting rotation of said turntable;
   and lifting means operative to lift the respective presses in a direction parallel to said axis into said high-frequency heating station.

2. An apparatus according to claim 1, wherein each diaphragm press is independent of the other and includes:
   a metal bottom plate;
   a lower fixed member, disposed on said metal bottom plate, provided with perforations;
   a rubber diaphragm covering said perforated lower fixed member and having substantially the same surface area as said lower fixed member;
   an intermediate floating member on which a mold, which is to be filled with material, is positioned;
   an upper fixed member; and
   means for applying fluid under pressure through the perforations of said lower fixed member into the space defined between said lower fixed member and said diaphragm,
   said floating member being positioned to press strongly against said upper member by virtue of force exerted by said diaphragm under the influence of fluid under pressure.

3. An apparatus according to claim 2, wherein said intermediate member and said lower member are connected by a metal electrically conducting element enabling high-frequency current to return to ground, the current feed being via said upper member.

4. An apparatus according to claim 3, wherein said upper and lower fixed members include fluid circulation channels therein and said cooling means cause circulation of a cooling fluid through said circulation channels.

5. An apparatus according to claim 2, wherein said cooling means includes a cooling device disposed coaxially with the axis of rotation of said turntable and conduits connecting said cooling device to said fixed upper and lower members.

6. An apparatus according to claim 2, wherein said cooling means includes a cooling device positioned in spaced relation from said edge of said turntable and conduits coupling said cooling device to said fixed upper and lower members.

7. An apparatus according to claim 1, wherein said high-frequency heating station includes a hood which defines a cavity into which each press, driven upward by said lifting means, fits sequentially, and wherein each said press includes a respective metal bottom plate therebeneath having larger planar dimensions than the associated press to enable said cavity to be sealed hermetically, said bottom plate constituting a ground return for high-frequency current.

8. An apparatus according to claim 1, including a mold parting station, and wherein each of said independent diaphragm presses hold an article being molded under pressure during the heating-cooling cycles and during rotation of said turntable, up to said mold parting station.

9. An apparatus according to claim 1, including a respective mold in each said press shaped as a negative of at least a portion of a piece of footwear having extra thickness at given areas.

10. An apparatus according to claim 1, including a respective mold in each press shaped as a negative of an article of manufacture having extra thickness at given areas.

* * * * *